(12) United States Patent  
Peterson et al.

(10) Patent No.: US 7,048,343 B2  
(45) Date of Patent: May 23, 2006

(54) ENDLESS ELASTOMERIC TRACK WITH CORROSION RESISTANT CABLES

(75) Inventors: Paul John Peterson, Cuyahoga Falls, OH (US); Katherine Ann Folk, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/841,153

(22) Filed: May 7, 2004

(65) Prior Publication Data

US 2004/0207259 A1  Oct. 21, 2004

Related U.S. Application Data

(63) Continuation of application No. 10/142,025, filed on May 9, 2002.

(51) Int. Cl.  
B62D 55/208  (2006.01)

(52) U.S. Cl. .................. 305/157; 305/165; 152/451

(58) Field of Classification Search ............ 305/165, 305/157, 178, 160, 451, 492, 98, 170, 167, 305/177; 152/451, 556, 527; 57/213, 902; 48/108; 427/360, 11  
See application file for complete search history.

(56) References Cited

U.S. PATENT DOCUMENTS

| 2,793,150 | A | | 5/1957 | Deaves ................... 154/52.1 |
|---|---|---|---|---|
| 3,900,231 | A | | 8/1975 | Ohm ......................... 305/35 |
| 4,383,005 | A | * | 5/1983 | Weil et al. ................ 428/625 |
| 4,677,033 | A | * | 6/1987 | Coppens et al. ........... 428/677 |
| 4,721,498 | A | * | 1/1988 | Grob ......................... 474/261 |
| 5,014,760 | A | | 5/1991 | Bombeke et al. .......... 152/141 |
| 5,131,215 | A | | 7/1992 | Williames ................. 56/27.5 |
| 5,252,405 | A | | 10/1993 | Kaido et al. .............. 428/462 |
| 5,287,691 | A | * | 2/1994 | Okamoto et al. ............ 57/236 |
| 6,086,811 | A | | 7/2000 | Fike ....................... 264/271.1 |
| 6,296,329 | B1 | | 10/2001 | Rodgers et al. ............ 305/165 |
| 6,372,071 | B1 | | 4/2002 | Garro et al. ............... 156/124 |

FOREIGN PATENT DOCUMENTS

| EP | 1197515 |   | 4/2002 |
|---|---|---|---|
| EP | 1197515 A1 | * | 4/2002 |
| JP | 07069253 |   | 3/1995 |
| JP | 07069253 A | * | 3/1995 |
| JP | 9279492 |   | 10/1997 |
| JP | 9279492 A | * | 10/1997 |
| JP | 9279493 |   | 10/1997 |
| JP | 11021389 |   | 1/1999 |
| JP | 11021389 A | * | 1/1999 |

* cited by examiner

Primary Examiner—Frantz F. Jules  
(74) Attorney, Agent, or Firm—Nancy T. Krawczyk

(57) ABSTRACT

This invention relates to annular or endless elastomeric track 10 for use in vehicles for civil engineering, construction works and agricultural works. The track 10 has a thin belt 20 which includes a primary table 59 made of corrosion resistant galvanized steel. The track 10 further has a plurality of spaced rubber traction tread lugs 30, on the outer surface oriented generally inclined, transverse or substantially perpendicular to the circumferential direction and guide lugs 32 on the internal surface 31.

7 Claims, 1 Drawing Sheet

ENDLESS ELASTOMERIC TRACK WITH CORROSION RESISTANT CABLES

This is a Continuation of Application Ser. No. 10/142,025, filed May 9, 2002, now U.S. Pat. No. 6,764,143.

TECHNICAL FIELD

This invention relates to an annular elastomeric track for use in vehicles for civil engineering, construction works and agricultural works.

BACKGROUND OF THE INVENTION

Molded rubber tracks are in many cases being substituted for conventional metal tracks. Rubber tracks offer better maneuverability, better ride quality in rough fields, better flotation in wet areas, improved side hill stability, excellent traction, low maintenance and versatility compared to steel tracks.

Additionally, rubber tracks are replacing conventional rubber tires on tractors and other agricultural vehicles such as combines, trenchers, snow removers, spreaders, sprayers, wagons and carts, since rubber tracks are more friendly to agricultural fields, offer better flotation and less compaction than rubber tires, resulting in better crop yield. The use of rubber tractor tracks permits farmers to get in and out of fields earlier in the planting season and plant more crops as compared to rubber tire-equipped agricultural vehicles.

In civil engineering applications tracks are employed on many construction equipment type vehicles such as road pavers and the like. These tracks are generally made from steel or steel with urethane or rubber pads. These tracks require much maintenance and in the case of steel tracks the damage to paved surfaces is a serious problem. Also, these construction type tracks can be placed over tires for skid steer equipment. A new advance in this area is the use of an all rubber steel cord track. The Goodyear Tire & Rubber Company provides such a track under the trademark TRACKMAN®, and the Bridgestone/Firestone Company provides a similar track under the name Firetrax®. These tracks have rubber lugs that extend across the entire width of the track.

Rubber tracks are defined by an endless rubber belt or band reinforced with continuous flexible steel cables bonded into the rubber. Presently, a complete rubber track is molded flat in multiple sections, which are sequentially then bonded together during the curing process. Alternatively an endless rubber track can be made in annular form wherein the track is made from an uncured belt and a plurality of drive lugs wherein the drive lugs are urged into cavities formed in inner segments of a molding press, partially final formed and pressed onto the inner periphery of the belt, the belts and drive lugs are positioned in the molding press to be cured and molded together while treads are formed on the outer periphery of the belt. The drive lugs are finally formed and the completed belt is cooled and removed from the molding press forming an annular track as described in U.S. Pat. No. 6,051,178 issued Apr. 18, 2000, to the assignee, The Goodyear Tire & Rubber Company.

In each of the methods of manufacture the outer periphery has a plurality of spaced tread lugs. Generally in the prior farm tire art these tread lugs extend from each lateral edge of the track towards the center of the track terminating at the central location or mid-point of the track. These lugs generally take the appearance of agricultural tire lugs with a generally inclined but slightly more transverse extending inclination relative to the direction of travel. Additionally, these lugs can be staggered or circumferentially offset from one side of the track to the other. This helps insure that the track has sufficient bending moment as the track traverses over the drive wheels and guide wheels at each extremity of the elliptical shape track as it traverses in use. If the tread lugs extend from one side of the tracks' lateral edge to the opposite side, then it is believed that the lugs should be substantially perpendicular to the direction of the circumferential links of the track in order for the lugs to achieve appropriate bending moment in flexibility as it rotates around the drive wheels. For this reason, it is felt necessary to provide the tracks with two sets of lugs that act somewhat independently relative to the lugs set of the opposite side of the track so that the track itself can bend in a rather flexible nature. Absent this bending, severe loads result in the belt reinforcing structure causing potential separations and other defects in the track itself as has been observed in some of the prior art rubber construction tracks previously mentioned.

The belt reinforcing structure of a track has at least one primary cable for reinforcing the track in the circumferential direction and usually at least an additional two layers of crossed angled cords which provide lateral stability. Each layer of cords is encapsulated in a layer of rubber. The entire belt structure must be very flexible and therefore is designed to be thin in cross-sectional thickness. This thin structure is sometimes cut by debris trapped internally or cut by simply driving over debris such as concrete rubble, steel or trash found at typical construction sites or in the fields.

Once the belt is cut the reinforcing cords are exposed to moisture which can quickly oxidize the steel cords. Typically a thin brass coating is applied to the steel to improve adhesion to the rubber. The reaction of brass coated steel to oxidation is such that the steel preferentially corrodes relative to the brass coating. The brass plating when combined with the steel gives good to excellent rubber adhesion. A secondary failure of a rubber track occurs if the cords separate locally from the rubber. When this situation occurs, the reinforcement cords of the belt progressively separate from the track ultimately making the track useless.

To extend track life great efforts are expended in developing new tread compounds, belt rubbers, and guide lug compounds.

One way to increase track durability would be to improve the corrosion resistance of the belt reinforcing structure while maintaining high cord to rubber adhesion. The following invention discloses a novel construction to achieve this result.

SUMMARY OF THE INVENTION

An endless elastomeric track has guide lugs on the inner circumference and rubber tread lugs on the outer circumference and a thin band continuously extending in the circumferential direction. The thin band is circumferentially reinforced by substantially inextensible cords. Preferably the cords are steel reinforced materials.

The track has at least one primary cable of galvanized steel circumferentially reinforcing the thin band. The at least one primary cable is oriented generally circumferentially and is preferably helically wound forming one reinforced layer extending from a first end on a first side of the track to a second end on the opposite end of the track. The at least one primary cable has a diameter of between 2.0 mm and 14.0 mm, preferably about 5.3 mm. The at least one primary cable is galvanized steel and in the preferred embodiment has a wire bundle construction having ((3×0.35 mm)+(6× 0.63 mm)+6×(0.63 mm+6×0.57 mm)).

The primary cable 59 is encapsulated in a rubber 22 having a rubber mixture composition comprising of the following, based upon 100 parts by weight elastomers (phr)

(A) elastomers comprised of 20–100 phr isoprene rubber and corresponding zero to 80 phr of styrene/butadiene rubber;

(B) 30 to 70 phr of reinforcing filler selected from rubber reinforcing carbon black and silica comprised of 20 to 70 phr of said carbon black and from zero to 40 phr silica;

(C) Calcined litharge 2 to 5 phr;

(D) Sulfur from 2 to 5 phr; and (E) Zinc oxide from 3 to 9 phr.

Optionally the composition may further include a reinforcing resin system such as resorcinol and HMMM in amounts of about 2.2 phr and 3.2 phr, respectively.

Alternatively, the calcined litharge can be substituted with cobalt salts in the range of 0.5 phr to 3 phr.

DETAILED DESCRIPTION OF THE INVENTION

Figure 1:
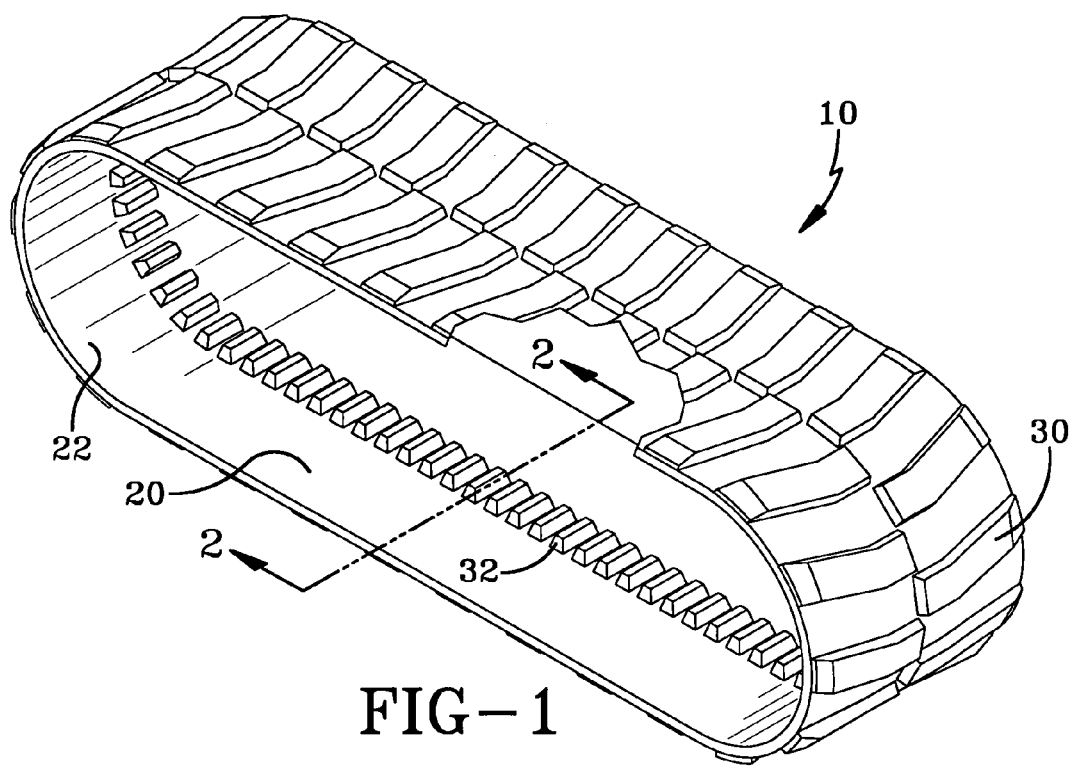
FIG. 1 is a perspective view showing a completed rubber track made in accordance with the present invention.
Figure 2:
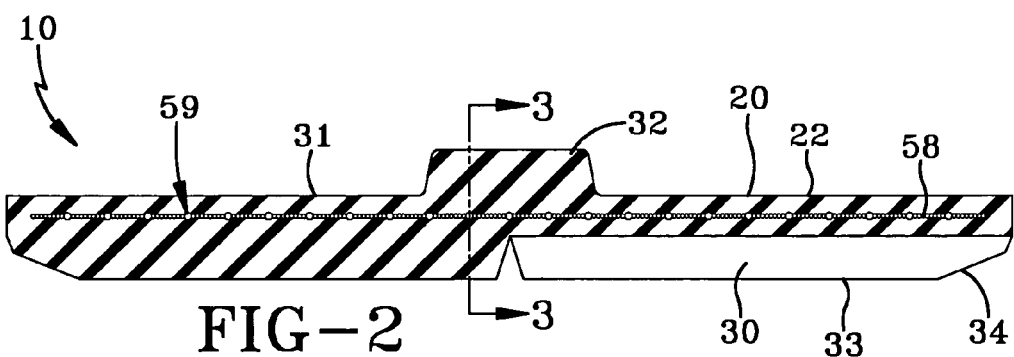
FIG. 2 is a cross-sectional view of the track taken along lines 2—2 of FIG. 1.
Figure 3:
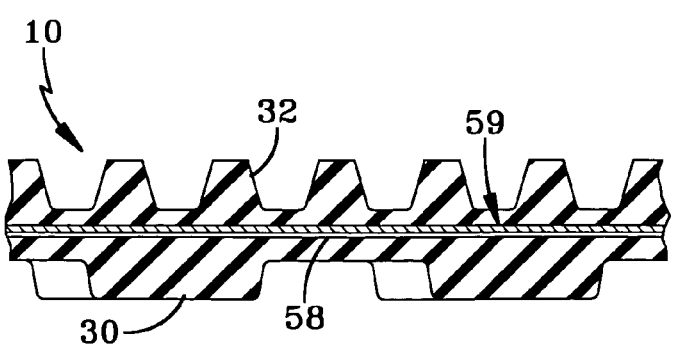
FIG. 3 is a cross-sectional view of the track taken along lines 3—3 of FIG. 2

Referring to the drawings, in FIG. 1 there is shown a completed rubber track 10 made according to the invention. This track 10 has a plurality of tread lugs 30 extending from each side of the lateral edges of the track towards the middle of the track. These lugs are designed somewhat similar to the lugs found on tractor tires. Such a track has an endless band 20 formed of rubber 22, the rubber 22 calendered to encapsulate cord and wire cable. It will be understood that such a track is adapted to be positioned upon the wheels, rollers, or tires (not shown) of a motorized vehicle such as a tractor or the like to support the vehicle for movement along a desired surface such as an agricultural field. The exterior peripheral surface of the band 20 is formed with integral tread lugs 30. The center portion of the inner peripheral surface of band 20 is formed with a plurality of conventional drive or guide lugs 32 which can engage complimentary sprockets (not shown) on the wheels or rollers of the drive vehicle which is supported by the track. With reference to FIGS. 1 through 3, the track of the present invention is shown.

As shown in FIGS. 2 and 3, the band 20 has a plurality of metallic or steel cables for reinforcement shown as 59 and 58 in the drawing encapsulated in rubber 22. The drive lugs 32 are shown in the central portion of the track 10 on its inner peripheral surface 31. The tread lugs 30 extend outward from the tread band 20 to an outer surface 33. Each tread lug 30 has a leading edge and a trailing edge as illustrated in FIG. 1 of the drawings. The distance between the leading edges and the trailing edges defines the lug width.

The thin band 20 may have a belt reinforcing structure having two or more cross plies reinforced by cords 58, the cords 58 being inclined at a bias angle relative to the circumferential direction, each layer being oppositely oriented. This cross ply structure provides lateral stability to the track 10. Alternatively, one or more of the cross plies can have cords oriented at 90° relative to circumferential direction. The cords 58 are preferably steel. The cords 58 may be brass coated. Alternatively the cords 58 are zinc coated or zinc in combination with other metals such as cobalt or nickel forming a galvanized steel cross ply structure.

The thin band 20 further may have at least one primary cable 59 that extends circumferentially along the length of the track 10. If one such cable 59 can be used then the cable may have a first end located near a first lateral end or side of the track 10 and the cable 59 can be helically wound numerous times to form a single layer of helically wound cable 59 that terminates at a second end on or near an opposite second lateral end or side of the track 10. Alternatively, the primary cable 59 may include several cables 59 circumferentially extending thus having multiple ends. The cable 59 may be a spliced belt of circumferentially extending cables 59. The cable 59, preferably, is spaced at 10 ends per inch or less across the width of the track.

Figure 4:
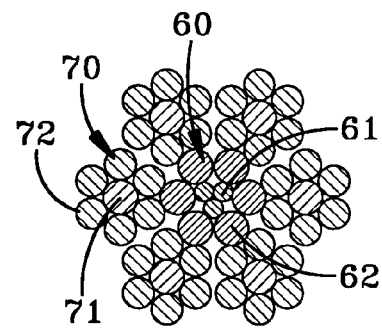
FIG. 4 is a cross-sectional view of a steel cable.

As shown in FIG. 4 the exemplary primary cable 59 has an outside diameter of about 5.3 mm, preferably the cable diameter is between 2.0 mm and 14.0 mm depending on the size of the track, the strength of the steel wire and the required flexibility of the thin band.

The cable 59 has a central core 60. The central core 60 has three (3) filaments 61 wrapped by six (6) filaments 62, the filaments 61 are a 0.35 mm diameter while the filaments 62 are a 0.63 mm diameter.

Wrapped around the core 60 is an outer sheath comprised of six (6) strands 70 of wire having a sheath core 71 wrapped by six (6) outer filaments 72, the sheath core 71 has a diameter of 0.63 mm while the outer filaments 72 have a diameter of 0.57 mm.

This construction of the primary cable 59 yields an overall diameter of about 5.3 mm.

The filaments 61 of the core 60 have a lay length of 8.0 S while the filaments 12 have a lay length of 17.1 S. The outer sheath 70 has an outer filament 72 lay length of 23.5 Z yielding a cable lay length of 40 S+/−2.0 S. The resultant cable has a minimum breaking strength of 28.4 kilo Newtons.

The test cable 59 of the present invention employed a galvanized coating of zinc. The coating of galvanized zinc typically is in the range of 0.5 mm to 1.5 mm. The galvanized zinc coating is not an inherently corrosion resistant metal but can be utilized as a sacrificial metal for cathodic protection of the underlying steel. In cathodic protection, the galvanized coating corrodes preferentially thus protecting the steel. The steel wires can be galvanized coated by either electroplating or a hot dip process.

Conventional brass coated steel cables are commonly used in tracks. Interestingly, the brass coating gives good wire to rubber adhesion making such a coating well suited for tracks. Rubber compound mixtures conventionally used in tire belt layers worked fine for such a brass-coated wire. Unfortunately, the brass-coated wires show a dramatic if not somewhat expected drop in rubber adhesion when exposed to salt water heated to 90° C.

By comparison galvanized zinc coated steel wires showed a dramatic insensitivity to heated salt water exposure. In fact, the rubber adhesion showed no degradation in adhesion.

A test rubber formulation within the previously mentioned formulation range was prepared. The rubber formulation had:

(A) 70 phr styrene/butadiene rubber (B) 30 phr isoprene rubber (C) 38 phr carbon black
(D) 32 phr silica
(E) 3.25 phr calcined litharge
(F) 2.4 phr sulfur
(G) 8 phr zinc oxide
(H) 2.2 phr resorcinol
(I) 3.2 phr HMMM.

Using a cable construction of (3×0.35 mm+6×0.63 mm)+ 6×(63 mm+6×0.57 mm) for a primary cable 59, one test cable 59 coated in brass and one test cable coated in zinc were cured into rubber blocks for 55 minutes at 310° F. Rubber adhesion pullout forces as measured in Newtons (N) of 2963 N for brass and 2712 N for zinc were obtained. The samples were then tested for adhesion pullout after three days and five days exposure to salt water heated to 90° C. The brass-coated steel cable to rubber adhesion dropped to 1734 N after 3 days and further declined to 1587 N after 5 days exposure. The zinc-coated galvanized steel cable to rubber adhesion pull out force after three days of heated salt water exposure was measured at a surprising 2783 N and was remarkably maintained at 2907 N after five days exposure to heated salt water.

This data showed an unexpected resistance to degradation of the galvanized steel cable to rubber adhesion upon exposure to heated salt water when compared to brass-coated steel cable.

Simple exposure of galvanized wire to prolonged humidity in a climate control room at 65° C./90% relative humidity for 15, 30 and 45 days has shown the resistance to wire corrosion as measured at breaking load. In U.S. Pat. No. 6,372,071 galvanized steel wire showed a remarkable ability to hold 90 to 99% of the original breaking strength while brass-coated wire had only 60 to 64% of the original breaking strength.

The preferred embodiment of the invention employed a simple zinc coated wire combined with a rubber mixture that required neither cobalt nor trimercaptotriazine, however, wire with combinations of zinc cobalt coating or zinc nickel coating may be alternatively used.

The resultant improvements in rubber adhesion and corrosion resistance when galvanized steel wire is employed in a track in combination with a rubber formulation as previously given yields the unexpected benefit of salt water corrosion resistance. It is appreciated that salt water accelerates the degradation when compared to water alone.

The current use of fertilizers and other salt laden chemicals in agricultural and construction environments means the present invention yields a much more durable track when facing such corrosive conditions.

What is claimed:

1. An endless elastomeric track having guide lugs on the inner circumference and rubber tread lugs on the outer circumference and a thin band continuously extending in the circumferential direction, the thin band having an exterior peripheral surface and an inner peripheral surface, the track comprising at least one primary cable of galvanized steel circumferentially reinforcing the thin band, wherein the at least one primary cable has a diameter between 2.0 and 14.0 mm and the at least one primary cable is a zinc-coated wire bundle having a ((3×0.35 mm)+(6×0.63 mm)+6×(0.63 mm+6×0.57 mm)) construction.

2. The endless elastomeric track of claim 1 wherein the at least one primary cable is helically wound forming a reinforced layer extending across the track from a first end on a first side of the track to a second end on the opposite side of the track.

3. The endless elastomeric track of claim 1 wherein the at least one primary cable has a 5.3 mm diameter.

4. The endless elastomeric track of claim 1 wherein the at least one primary cable is spaced at 10 ends per inch or less when viewed in a cross section taken across the width of the track.

5. The endless elastomeric track of claim 1 the track further comprising a belt reinforcing structure having two or more cross plies reinforced by cords of galvanized steel circumferentially reinforcing the thin band.

6. An endless elastomeric track having guide lugs on the inner circumference and rubber tread lugs on the outer circumference and a thin band continuously extending in the circumferential direction, the thin band having an exterior peripheral surface and an inner peripheral surface, the track comprising at least one primary cable of galvanized steel circumferentially reinforcing the thin band wherein the thin band is an elastomeric rubber mixture encapsulating the at least one primary cable, the elastomeric rubber mixture composition comprised of, based upon 100 parts by weight elastomers (phr), (A) elastomers comprised of 20–100 phr isoprene rubber and correspondingly, zero to 80 phr of styrene/butadiene rubber;
(B) 30 to 70 phr of reinforcing filler selected from rubber reinforcing carbon black and silica wherein the selected reinforcing filler is comprised of 20 to 70 phr of said carbon black and from zero to 40 phr silica,
(C) cobalt salt from 0.5 to 3 phr;
(D) Sulfur from 2 to 5 phr;
(E) Zinc oxide from 3 to 9 phr.

7. An endless elastomeric track having guide lugs on the inner circumference and rubber tread lugs on the outer circumference and a thin band continuously extending in the circumferential direction, the thin band having an exterior peripheral surface and an inner peripheral surface, the track comprising a belt reinforcing structure having two or more cross plies reinforced by cords of galvanized steel circumferentially reinforcing the thin band; wherein the thin band is an elastomeric rubber mixture encapsulating the reinforcing structure, the elastomeric rubber mixture composition comprised of, based upon 100 parts by weight elastomers (phr), (A) elastomers comprised of 20–100 phr isoprene rubber and correspondingly, zero to 80 phr of styrene/butadiene rubber;
(B) 30 to 70 phr of reinforcing filler selected from rubber reinforcing carbon black and silica wherein the selected reinforcing filler is comprised of 20 to 70 phr of said carbon black and from zero to 40 phr silica,
(C) cobalt salt from 0.5 to 3 phr;
(D) Sulfur from 2 to 5 phr;
(E) Zinc oxide from 3 to 9 phr.

* * * * *